(12) United States Patent
Usui et al.

(10) Patent No.: US 7,742,207 B2
(45) Date of Patent: Jun. 22, 2010

(54) IMAGE PROCESSING APPARATUS, METHOD OF UPDATING COLOR-CONVERSION TABLE, AND COMPUTER PROGRAM PRODUCT

(75) Inventors: Nobuaki Usui, Ishikawa (JP); Seigo Kotani, Kanagawa (JP)

(73) Assignees: PFU Limited, Ishikawa (JP); Fujitsu Limited, Kanagawa (JP)

( * ) Notice: Subject to any disclaimer, the term of this patent is extended or adjusted under 35 U.S.C. 154(b) by 808 days.

(21) Appl. No.: 11/622,336

(22) Filed: Jan. 11, 2007

(65) Prior Publication Data
US 2007/0165253 A1 Jul. 19, 2007

(30) Foreign Application Priority Data
Jan. 18, 2006 (JP) .............................. 2006-010357
Jun. 7, 2006 (JP) .............................. 2006-158721

(51) Int. Cl.
*H04N 1/60* (2006.01)
*G06K 9/00* (2006.01)

(52) U.S. Cl. .................. 358/518; 358/1.9; 358/3.23; 358/523; 358/1.15; 382/162; 382/167

(58) Field of Classification Search ............... 358/518, 358/1.9, 3.23, 523, 1.15; 382/162, 167
See application file for complete search history.

(56) References Cited

U.S. PATENT DOCUMENTS 6,072,874 A * 6/2000 Shin et al. .................. 380/231
7,484,241 B2 * 1/2009 Challener et al. ............... 726/5
7,603,702 B2 * 10/2009 Crane .......................... 726/21
2003/0210414 A1 11/2003 Kuno

FOREIGN PATENT DOCUMENTS

| JP | 05-252392 | 9/1993 |
|---|---|---|
| JP | 08-79546 | 3/1996 |
| JP | 2001-346062 | 12/2001 |
| JP | 2005-317026 | 11/2005 |
| JP | 2003-163806 | 1/2007 |

OTHER PUBLICATIONS

English Abstract of "Image technology colour management—Architecture, profile format and data structure—Part 1: Based on ICC. 1:2004-10".
Office Action isssued in corresponding Chinese Patent Application No. 200710001765.7, dated Dec. 18, 2009.

* cited by examiner

*Primary Examiner*—Charlotte M Baker
(74) *Attorney, Agent, or Firm*—Lowe Hauptman Ham & Berner

(57) ABSTRACT

An updating unit updates a color-conversion table stored in a storing unit. An image processing unit processes an input image data based on updated color-conversion table. A tamper-resistant chip that includes a first collecting unit that collects log information related to a usage of the image processing apparatus, a generating unit that generates a hash value corresponding to collected log information, and a recording unit that records generated hash value. An acquiring unit acquires the log information corresponding to the hash value by referring to recorded hash value. The updating unit updates the color-conversion table based on acquired log information.

6 Claims, 5 Drawing Sheets

IMAGE PROCESSING APPARATUS, METHOD OF UPDATING COLOR-CONVERSION TABLE, AND COMPUTER PROGRAM PRODUCT

RELATED APPLICATIONS

The present application is based on, and claims priority from, Japan Application Number 2006-10357, filed Jan. 18, 2006 and Japan Application Number 2006-158721, filed Jun. 7, 2006 the disclosures of which are hereby incorporated by reference herein in their entirety.

BACKGROUND OF THE INVENTION

1. Field of the Invention

The present invention relates to a technology for updating a color-conversion table in an image processing apparatus based on a usage log of the image processing apparatus.

2. Description of the Related Art

As seen with the enforcement of e-Document Law in Japan for promoting electronic documents in business environment, high quality of electronic data to be output and high quality of papers for outputting the electronic data are being required so that admissibility of evidence and authorized original of the electronic data can be assured at the same level of assurance that has been secured in current paper evidences. However, if there is an uncontrollable quality change for outputting the data, and if the quality change is occurred in a remote place, the quality of the electronic data to be output on the papers cannot be assured, resulting in making a generated document insufficient for required specifications.

In the area of image processing, technologies for reproducing same colors in output data from input data regardless of various effects such as a difference in apparatus characteristics, environmental variation, or aged deterioration are disclosed. For example, Japanese Patent Application Laid-open No. H05-252392 discloses a technology for reproducing same colors regardless of the environmental variation or the aged deterioration by detecting tone-reproduction changes in an image output unit and changing input/output property. Japanese Patent Application Laid-open No. H08-079546 discloses a technology for changing a parameter for a color gamut and setting a correct color gamut corresponding to conditions of various devices in an image processing apparatus or conditions of inks used in the apparatus, even when the color gamut is different for different apparatuses due to a difference in apparatus characteristics, the environmental variation, or the aged deterioration. Japanese Patent Application Laid-open No. 2001-346062 discloses a technology for converting acquired image data based on default color data to reproduce same colors, in a general color-management system for various input/output devices, regardless of the aged deterioration or the differences in devices.

For a security enhancement independently promoted by each enterprise, a trusted computing group (TCG) as an industry organization of the enterprises that provide technologies for personal computer (PC) platforms contributes to develop and promote new hardware/software having higher reliability and security. Japanese Patent Application Laid-open No. 2005-317026 discloses a technology with which the TCG determines a specification of a trusted platform module (TPM) chip related to a security chip for a computing platform.

SUMMARY OF THE INVENTION

It is an object of the present invention to at least partially solve the problems in the conventional technology.

An image processing apparatus according to one aspect of the present invention includes a storing unit that stores a color-conversion table for reproducing a color property that is unique to the image processing apparatus; an updating unit that updates the color-conversion table; an image processing unit that processes an input image data based on updated color-conversion table; a tamper-resistant chip that includes a collecting unit that collects log information related to a usage of the image processing apparatus, a generating unit that generates a hash value corresponding to collected log information, and a recording unit that records generated hash value; and an acquiring unit that acquires the log information corresponding to the hash value by referring to recorded hash value. The updating unit updates the color-conversion table based on acquired log information.

A method according to another aspect of the present invention is for updating a color-conversion table for reproducing a color property that is unique to an image processing apparatus that includes a tamper-resistant chip. The method includes collecting including the tamper-resistant chip collecting log information related to a usage of the image processing apparatus; generating including the tamper-resistant chip generating a hash value corresponding to collected log information; recording including the tamper-resistant chip recording generated hash value; and acquiring the log information corresponding to the hash value by referring to recorded hash value; and updating the color-conversion table based on acquired log information.

A computer program product according to still another aspect of the present invention includes a computer usable medium having computer readable program codes embodied in the medium. The computer readable program codes are for updating a color-conversion table for reproducing a color property that is unique to an image processing apparatus that includes a tamper-resistant chip, and when executed cause a computer to execute collecting log information related to usage of an image processing apparatus by using a chip having tamper resistance installed in the image processing apparatus; generating hash value corresponding to the log information collected by the collecting; recording the hash value generated by the generating; acquiring the log information corresponding to the hash value recorded by the recording; and updating a color-conversion table stored in the image processing apparatus, for reproducing color property unique to each image processing apparatus, based on the log information acquired by the acquiring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below. For example, a scanner and a printer are explained as examples of an image processing apparatus and a TPM chip is explained as an example of a tamper-resistant chip included in the image processing apparatus according to the present invention. However the present invention is not thus limited.

Figure 1:
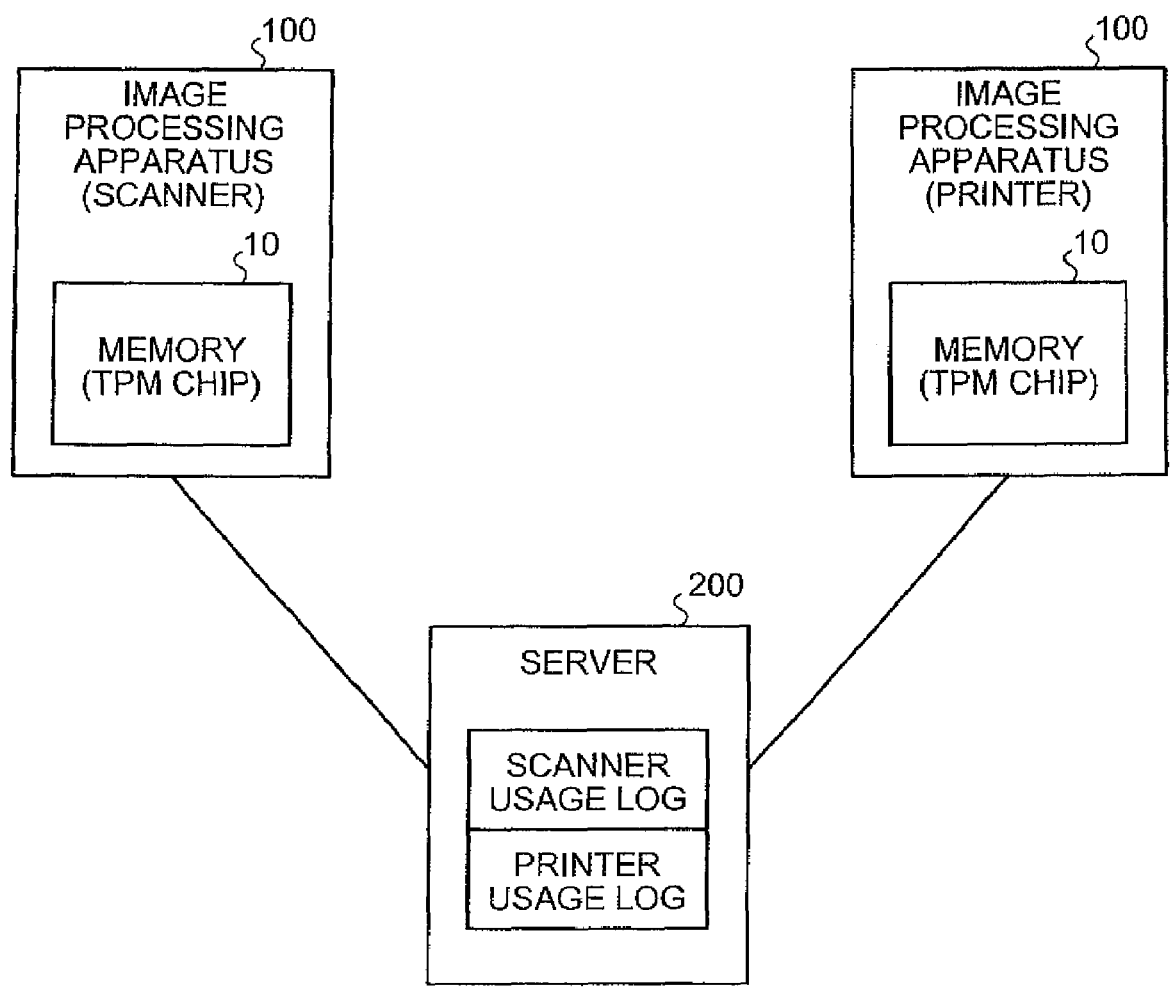
FIG. 1 is a schematic for explaining a general concept of the present invention.

FIG. 1 is a schematic for explaining a general concept of an image processing employing an image processing apparatus 100 according to the present invention. The image processing apparatus 100 collects usage-log information (log information related to usage) related to a usage log for using the image processing apparatus 100 (i.e., an apparatus ID, usage date and time, usage hours, and usage type) with a TPM chip 10, which has tamper resistance and is installed in the image processing apparatus 100. Thereafter, the image processing apparatus 100, with the TPM chip 10, generates a hash value corresponding to the collected usage-log information and records an address associated with a storage area for storing the generated hash value and/or the usage-log information in the TPM chip 10. The address can be obtained by performing a predetermined calculation with a numeric existing in the TPM chip 10. The address associated with the storage area for storing the generated hash value and/or the usage-log information can be stored in a storage device, i.e., a hard disk drive, if the address is encoded with a secret key unique to the TPM chip 10.

The usage-log information collected by the TPM chip 10 is stored in the storage device, i.e., a hard disk drive, equipped with the image processing apparatus 100. Alternately, the usage-log information can be stored in a server 200 connected to the image processing apparatus 100 for a communication therebetween as shown in FIG. 1. Specifically, the image processing apparatus 100 sends the usage-log information to the server 200 for storing the usage-log information in the server 200. When sending the usage-log information, the image processing apparatus 100 adds an electronic signature to the usage-log information and encodes the usage-log information with the secret key that is unique to each apparatus and pre-stored in the TPM chip 10. Thus, fraudulent alteration of the usage-log information can be effectively prevented with the TPM chip 10.

The image processing apparatus 100 refers to the hash value recorded in the TPM chip 10 and acquires the usage-log information corresponding to the hash value from the image processing apparatus 100 or the server 200.

The image processing apparatus 100 updates a pre-stored color-conversion table for reproducing a color property unique to each apparatus based on the acquired usage-log information. In other words, the image processing apparatus 100 updates each apparatus parameter based on the usage log so that a color property at the time of use can be reproduced with respect to each apparatus. Accordingly, an occurrence of a difference between input color and output color caused by environmental differences such as temperature and humidity can be prevented. The color-conversion table can be an international color consortium (ICC) profile proposed by an ICC, which is an organization founded for promoting an international standardization of color management techniques. A technology for the ICC profile is disclosed in a reference of "Image technology colour management-Architecture, profile format and data structure-Part 1: Based on ICC: 2004-10". If the image processing apparatus 100 is a printer, a technology disclosed in Japanese Patent Application Laid-open No. 2003-163806 proposed by inventors of the present invention can be applied.

The ICC profile is structured with a header and various tags. The header records basic data of the ICC profile such as a device type, a creator, and a type of a color space. The tags are, for example, a text tag (profile display name, etc.), a XYZ tag (representation of RGB (red, green, blue) data in absolute value), a color lookup table (CLUT) tag (a color-conversion table), and other specific tags.

The image processing apparatus 100 processes input data, such as a pre-input image data, based on the updated color-conversion table and generates corresponding output data.

The image processing apparatus 100 counts accumulated usage-log information. More specifically, the image processing apparatus 100 sorts the usage hours into a group based on each predetermined period of time (i.e., from Jan. 1, 2005 to Dec. 31, 2005) by referring to the usage date and time included in the usage-log information. Thereafter, the image processing apparatus sums up the usage hours in each group to manage the total usage hours with respect to each group. Thus, the usage-log information can be accumulated in the storage unit in a simple manner.

Figure 2:
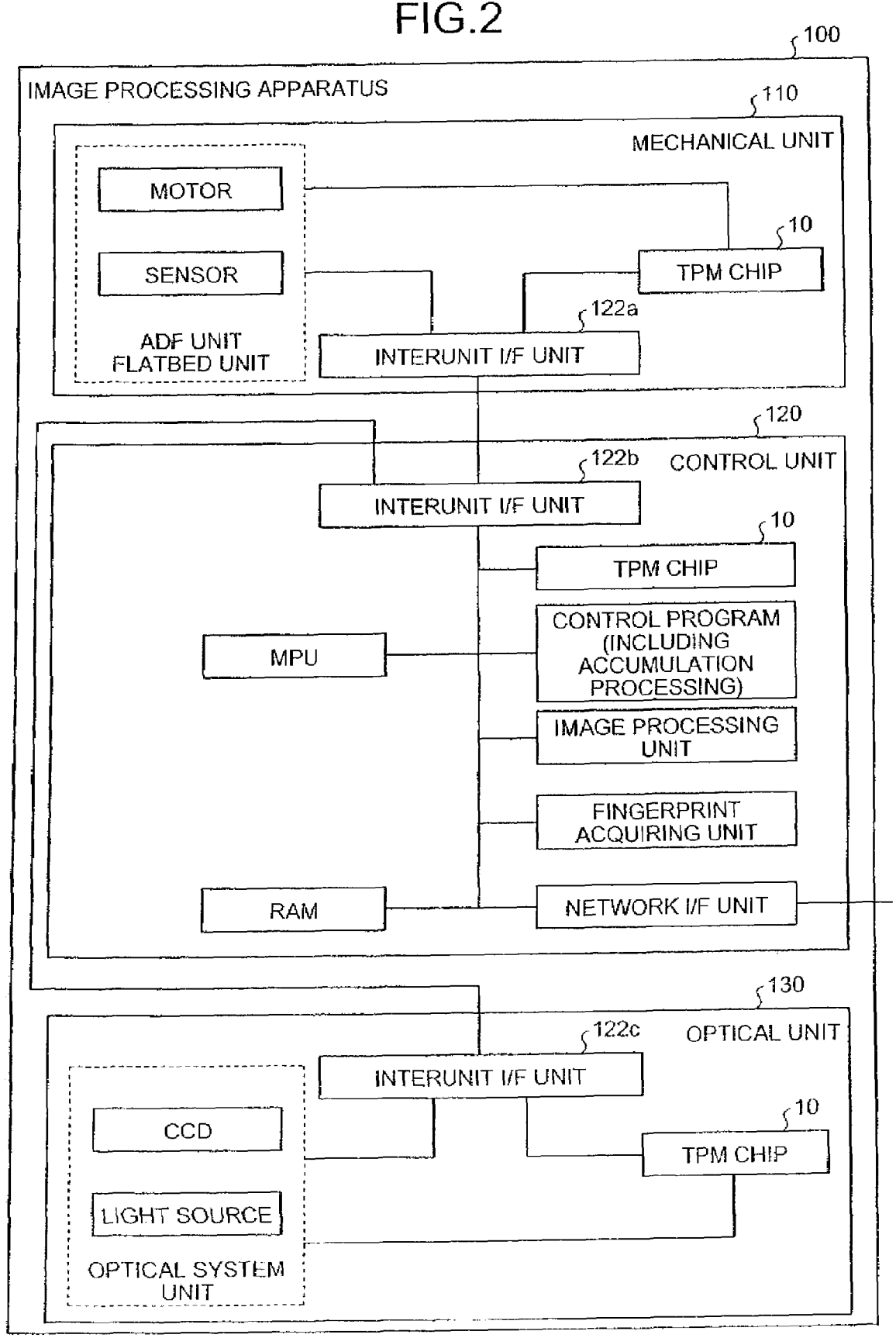
FIG. 2 is a block diagram of an image processing apparatus according to the present invention.

FIG. 2 is a block diagram of the image processing apparatus 100. Only a portion of a configuration of the image processing apparatus 100 is conceptually shown according to the present invention.

As shown in FIG. 2, the image processing apparatus 100 generally includes, as a minimal configuration, a mechanical unit 110, a control unit 120, and an optical unit 130. The image processing apparatus 100 includes the TPM chip 10 having tamper resistance, with respect to each unit for collecting information related to each unit (i.e., usage log), generating the hash value corresponding to the collected information, and recording the generated hash value in the TPM chip 10. The TPM chip 10 is provided in a body of each unit so that the TPM chip 10 cannot easily be removed from outside, with a configuration in which the unit cannot become active if the TPM chip 10 is removed. The TPM chip 10 stores apparatus information and a secret key necessary for creating the electronic signature and performing encoding. Further, the TPM chip 10 can include a user-authentication function for performing an authentication with, for example, a fingerprint. Each unit (the mechanical unit 110, the control unit 120, and the optical unit 130) can include a variety of sensors to measure an environment (temperature, humidity, altitude) of each unit.

The mechanical unit 110 includes an automatic document feeder (ADF) unit/flatbed unit including a motor and a sensor, and the TPM chip 10 interconnected to the ADF unit/flatbed unit via an interunit interface (I/F) unit 122a.

The control unit 120 includes a micro processing unit (MPU), a memory unit that stores a control program including accumulation processing that accumulates the usage-log information and a color-conversion table, an image processing unit, a fingerprint acquiring unit, a network I/F, a random access memory (RAM), and the TPM chip 10, which are all interconnected via an interunit I/F unit 122b.

The optical unit 130 includes an optical system device including a change coupled device (CCD) and a light source, and the TPM chip 10, which are interconnected via an interunit I/F unit 122c.

Figure 3:
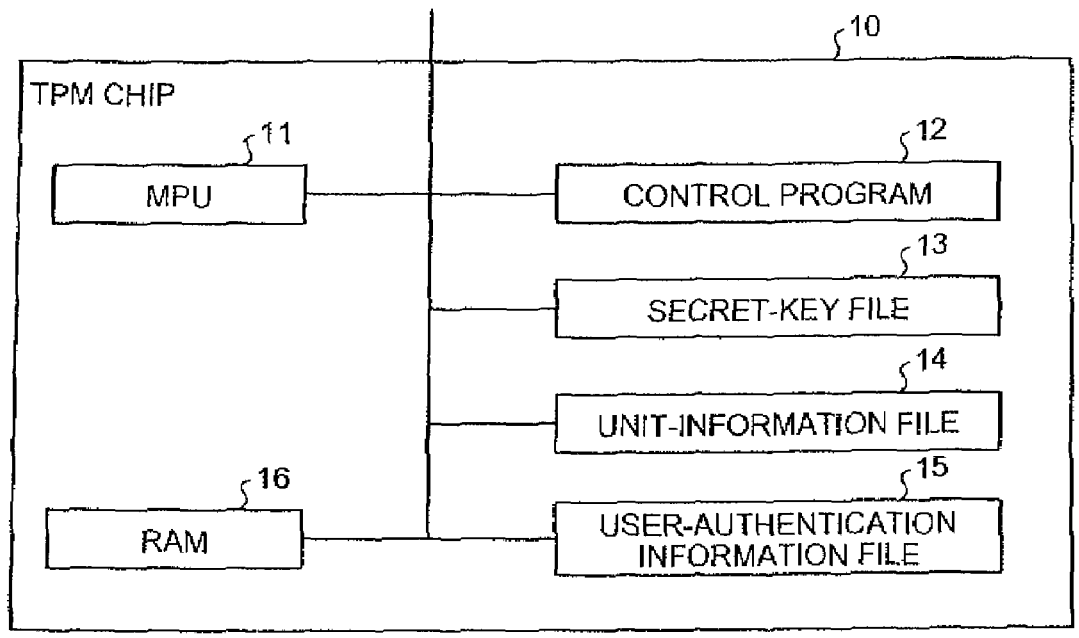
FIG. 3 is a block diagram of a TPM chip according to the present invention.

FIG. 3 is a block diagram of the TPM chip 10. Only a portion of a configuration of the TPM chip 10 is conceptually shown according to the present invention.

As shown in FIG. 3, the TPM chip 10 includes, as a minimal configuration, an MPU 11, a control program 12 for controlling each unit, a secret-key file 13 for encoding information, such as the apparatus information, a unit-information file 14 that stores at least an apparatus-identification number of each unit, a user-authentication information file 15 that stores a fingerprint information for authenticating a user, and a random access memory (RAM) 16 that stores the measured value related to the environment of each unit (i.e., temperature, humidity, altitude) and log information including setting parameter for operating each unit and a result of an operation.

Figure 4:
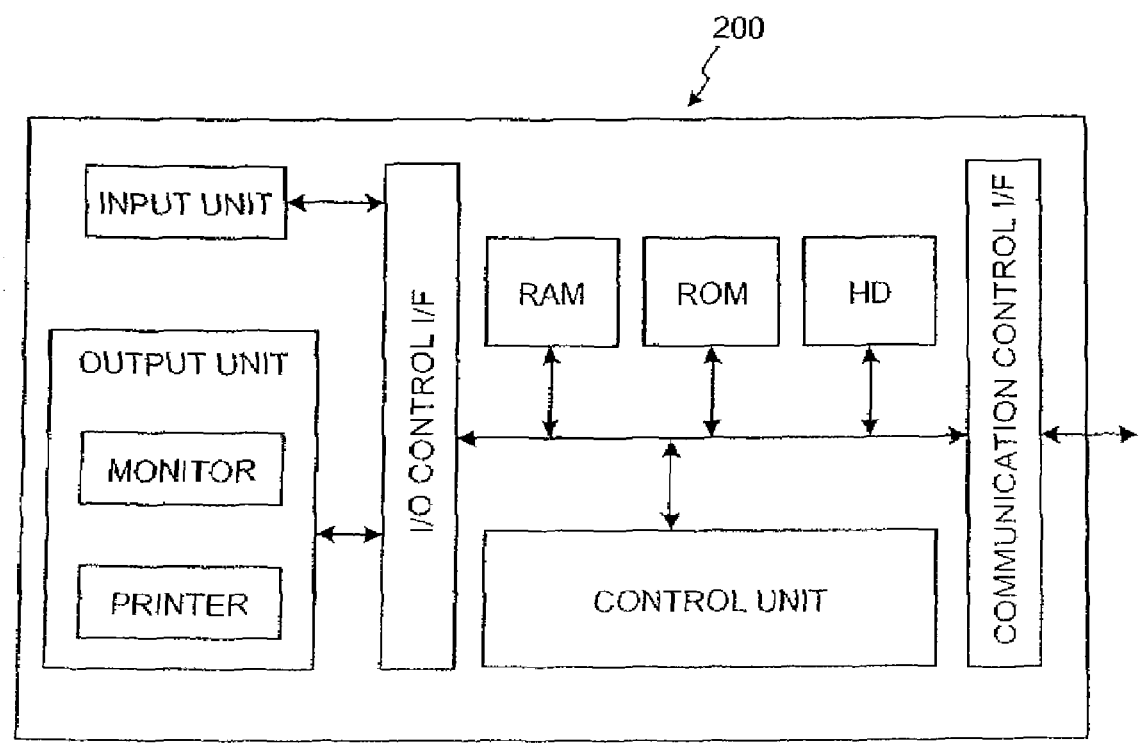
FIG. 4 is a block diagram of a server according to the present invention.

FIG. 4 is a block diagram of the server 200. Only a portion of a configuration of the server 200 is conceptually shown according to the present invention.

As shown in FIG. 4, a hardware structure of the server 200 includes an information processing apparatus such as a workstation or a PC that can be commonly obtained in a market and an attachment device of the information processing apparatus. More specifically, each function of the server 200 can be realized with a control unit including a central processing unit (CPU) that structures hardware, a hard disk drive, a storage unit including a memory unit such as a RAM and a read only memory (ROM), an input unit, an output unit, input/output (I/O) control I/F, a communication control I/F, and a computer program that controls the above units.

Figure 5:
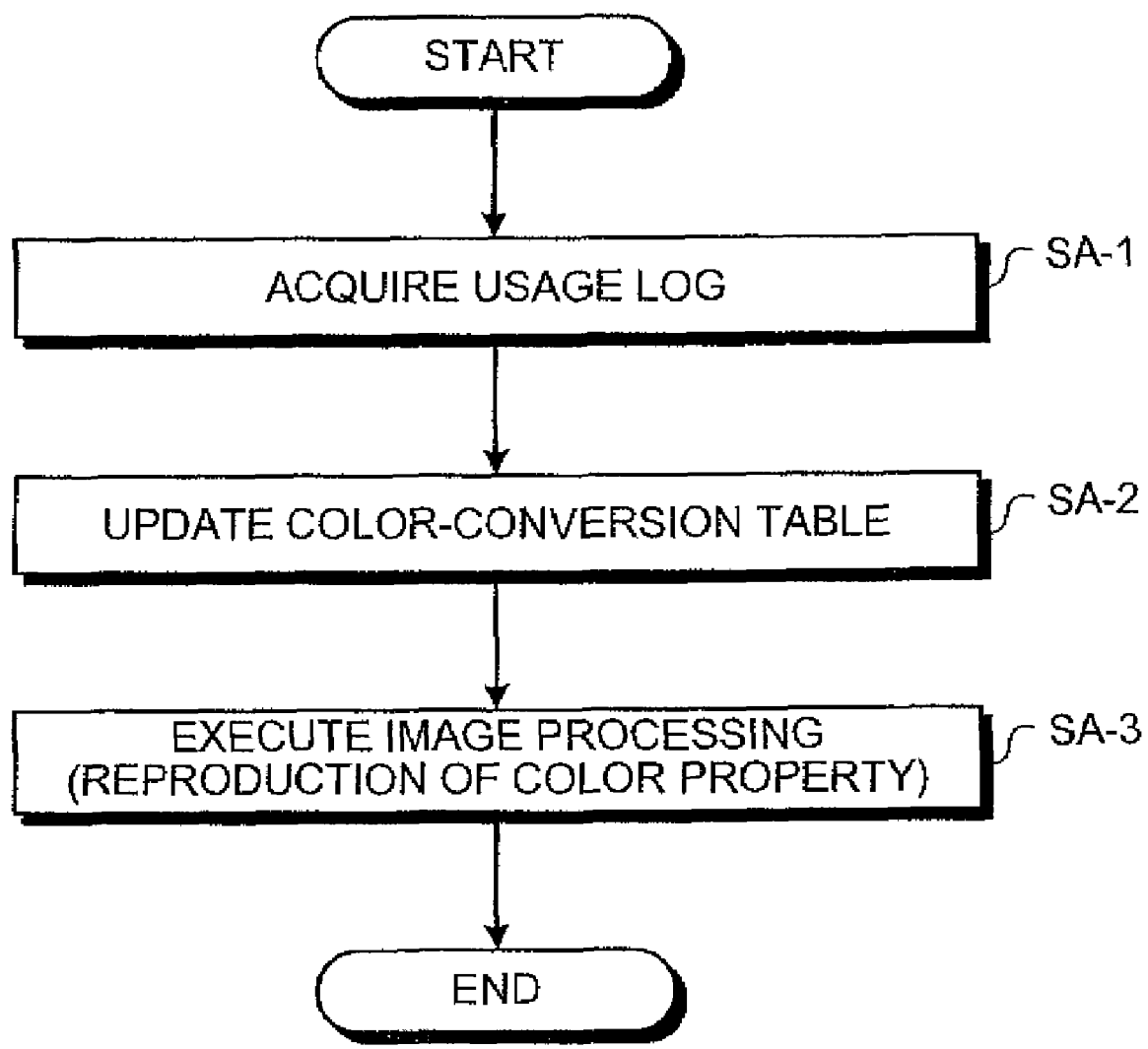
FIG. 5 is a flowchart of a processing procedure for an operation according to the present invention.

FIG. 5 is a flowchart of a processing procedure for an operation performed by the image processing apparatus 100.

It is assumed that the image processing apparatus 100, with the TPM chip 10, collects the usage-log information (log information related to usage) related to the usage log (i.e., usage hours and usage type) for using the image processing apparatus 100, generates the hash value corresponding to the collected usage-log information, and records the address associated with the storing area for storing the generated hash value and/or the usage-log information in the TPM chip 10.

The image processing apparatus 100 refers to the hash value recorded in the TPM chip 10 and acquires the usage-log information corresponding to the hash value from the image processing apparatus 100 or the server 200 (acquiring: step SA-1).

The image processing apparatus 100 updates a pre-stored color-conversion table for reproducing a color property unique to each apparatus, based on the usage-log information acquired at step SA-1 (updating: step SA-2). In other words, the image processing apparatus 100 updates each apparatus parameter, based on the usage log so that a color property at the time of use can be reproduced with respect to each apparatus. Accordingly, a color difference between input color and output color caused by environmental differences such as temperature and humidity can be prevented. The color-conversion table can be the ICC profile proposed by the ICC, which is an organization founded for promoting an international standardization of color management techniques. A technology for the ICC profile is disclosed in a reference of "Image technology colour management-Architecture, profile format and data structure-Part 1: Based on ICC: 2004-10". If the image processing apparatus 100 is a printer, a technology disclosed in Japanese Patent Application Laid-open No. 2003-163806 proposed by the inventors of the present invention can be applied.

The ICC profile is structured with a header and various tags. The header records a basic data of the ICC profile such as a device type, a creator, and a type of a color space. The tags are, for example, the text tag (profile display name, etc.), the XYZ tag (representation of RGB (red, green, blue) data in absolute value), the color lookup table (CLUT) tag (a color-conversion table), and other specific tags.

Figure 6:
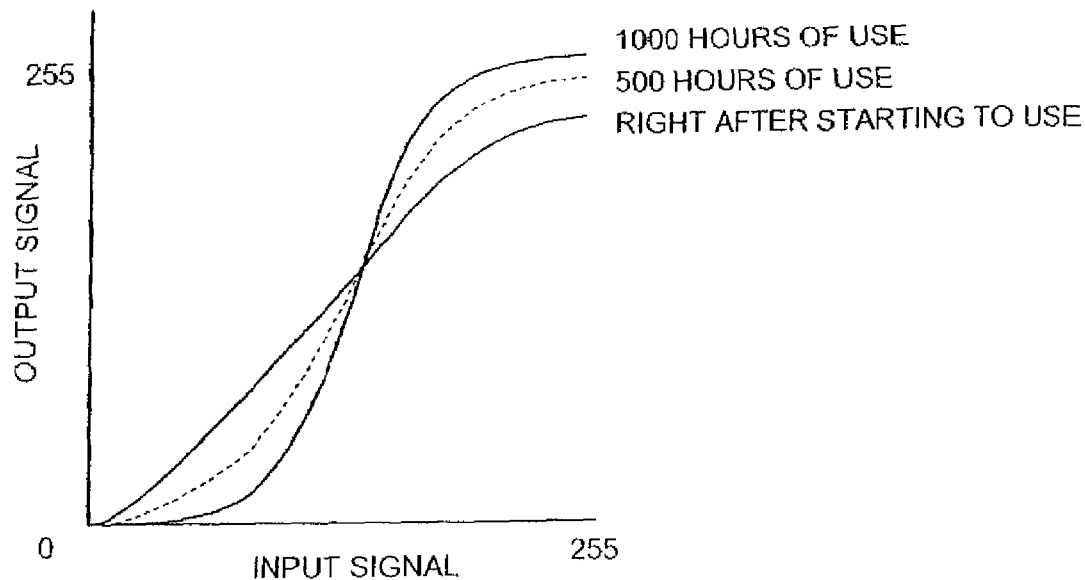
FIG. 6 is a graph for explaining an operation performed at step SA-2 shown in FIG. 5.

FIG. 6 is a graph for explaining an operation performed at step SA-2 shown in FIG. 5. As usage hours of an apparatus get longer, the shape of the tone curve becomes more and more steep. With a test of using the apparatus, data related to a variation of the shape of the tone curve depending on the usage hours is to be preliminarily generated. Thereafter, the image processing apparatus 100 interpolates the pre-generated tone curve based on the usage hours included in the acquired usage-log information and updates the tone curve to be corresponded to the acquired usage hours. As a result, the acquired usage hours of the apparatus can be reflected in the tone curve used for reproducing colors.

Figure 7:
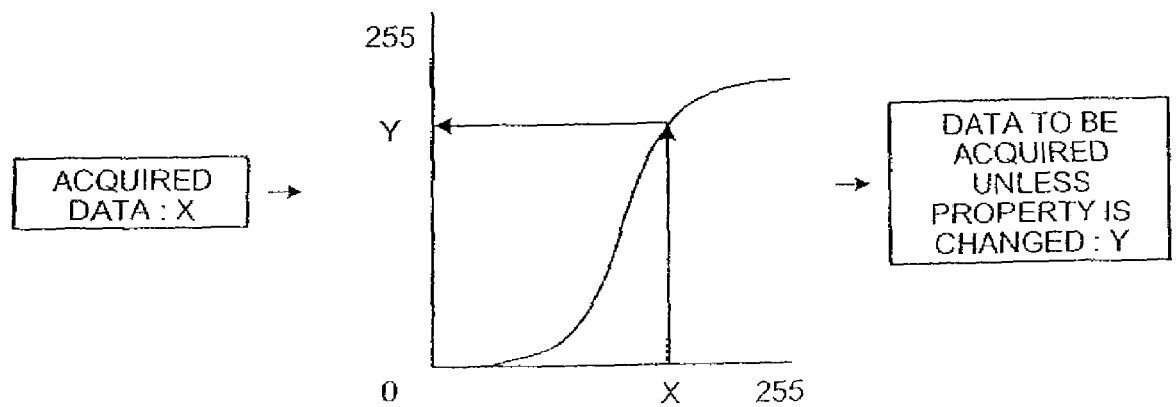
FIG. 7 is a graph for explaining an operation performed at step SA-3 shown in FIG. 5.

Referring back to FIG. 5, the image processing apparatus 100 processes input data such as pre-input image data based on the color-conversion table updated at step SA-2 and generates corresponding output data (image processing: step SA-3). Specifically, the image processing apparatus 100 converts a pre-acquired data X to new data Y based on a new town curve updated at step SA-2 as shown in FIG. 7.

As explained above, when the image processing apparatus 100 is used, the image processing apparatus 100 collects the usage-log information, generates the hash values of the collected usage-log information, and records the generated hash value in the TPM chip 10, by using the TPM chip 10. The image processing apparatus 100 refers to the hash value recorded in the TPM chip 10 to acquire the usage-log information corresponding to the hash value and updates the pre-stored color-conversion table based on the acquired usage-log information. Thereafter, the image processing apparatus 100 processes the input data such as the pre-input image data based on the updated color-conversion table. As a result, the color property at the time of use with respect to each apparatus can be accurately reproduced. More specifically, it becomes possible to assure the same quality between output data and input data, by using the usage log and considering the variation of the color property. In other words, an input/output apparatus can acquire each usage log and make input color and output color consistent in consideration of the variation of each color property. Therefore, every time the same data or the same color-chart is input, the same color or the same signal can be output. Further, it becomes possible to prevent a variation between the input color and the output color caused by differences of temperature or humidity.

It has been possible to record the usage log by, for example, installing special software for collecting the usage log and installing a special memory for recording the collected usage log into an apparatus. However, it is practically difficult to install mechanism, into the image processing apparatus, necessary for recoding the usage log only for a purpose of controlling an aged deterioration of the color property of the input/output apparatus because it causes cost increase. On the other hand, a chip having a tamper-resistance such as the TPM chip has recently been proposed for assuring security. Because the chip can be used for a parameter authentication, a function for recording the usage log of the apparatus is preliminarily installed in the chip. Accordingly, by installing the TPM chip having the function of recording the usage log into the image processing apparatus, a reproduction of the color property can be realized in addition to achieving a security assurance. As a result, costs for controlling the aged deterioration of the color property of the input/output apparatus can be reduced. Further, if the usage log is collected with the software having been used, the collected usage log can easily be altered. Therefore, a reliability of the usage log cannot be assured with a high quality. On the other hand, the image processing apparatus 100 includes the TPM chip 10, resulting in assuring a reliability of the usage log with a high quality.

With the image processing apparatus 100 according to the present invention, the input color and the output color can be stabilized taking an effect caused by a setting environment, the aged deterioration, or an apparatus characteristics into consideration. Accordingly, if the image processing apparatus 100 is set in each site and each client and if the image processing apparatuses 100 are interconnected via a network, a color property at the time of use with respect to each apparatus can be reproduced. Further, costs currently required for distributing paper products such as newspapers or advertising leaflets can be reduced. For the paper products such as newspapers and advertising leaflets that require a high quality, the quality of printed products has been managed by performing a printing at a specific site in a concentrated manner and distributing the printed products to each local site. On the contrary, if the image processing apparatus 100 is used, quality of the printed products can be managed by electronically sending data and outputting the data with the image processing apparatus 100 set at a destination site. As a result, costs currently required for distributing the paper products such as newspapers and advertising leaflets can be effectively reduced.

The present invention in its broader aspects is not limited to the specific details and representative embodiments shown and described herein. Accordingly, various modifications may be made without departing from the spirit or scope of the general inventive concept as defined by the appended claims and their equivalents. For example, of the various types of processing explained in the description of the exemplary embodiments, it is acceptable to manually perform a part or all of the processing that is explained to be performed automatically. Conversely, it is acceptable to automatically perform, using a publicly-known technique, a part or all of the processing that is explained to be performed manually.

In addition, the processing procedures, the control procedures, the specific names, the information including various types of data and parameters, the images, and the database structures that are presented in the text and the drawings can be modified in any form, except when it is noted otherwise.

The constituent elements of the apparatuses shown in the drawings are based on functional concepts. The constituent elements do not necessarily have to be physically arranged in the way shown in the drawings. For example, a part or all of the processing functions offered by the apparatuses may be realized by a CPU and a program analyzed and executed by the CPU, or may be realized as hardware with wired logic. The programs are recorded in the recording medium, explained later, and to be mechanically acquired by the control unit as required.

A computer program that gives an instruction to the CPU in association with an operating system (OS) for performing various processing is stored in a storage unit such as a ROM or a hard disk (HD). The computer program is loaded into the RAM to be executed, and implements the control unit in cooperation with the CPU. The computer program can be stored in an application program server connected via a network and a part of or the entire computer program can be downloaded as required.

The computer program according to the present invention can be stored into a computer-readable recording medium including a removable physical medium, a built-in physical medium, and a communication medium that holds the program for a short time. The removable physical medium includes a flexible disk (FD), a magneto optical (MO) disk, a ROM, an erasable programmable read only memory (EPROM), an electrically erasable programmable read only memory (EEPROM), a compact disk-read only memory (CD-ROM), or a digital versatile disk (DVD). The built-in physical medium includes a ROM, a RAM, or a HD that is installed in the computer system. The communication medium includes a communication line or a carrier for transmitting the program via a network such as a local area network (LAN), a wide area network (WAN), or the Internet. The program is a data processing method written in arbitrary languages in arbitrary written formats, leading that both a source code and a binary code can be acceptable. The program is not necessarily prepared in a single structure and can be separately prepared as a plurality of modules or libraries. Also, programs that realize the functions in association with other programs such as an OS can be included. The specific configurations for reading the recording medium in each unit according to the embodiments, reading procedures, and install procedures after the reading can be known configurations and procedures.

The specific mode in which the apparatuses are distributed and integrated is not limited to the ones shown in the drawings. A part or all of the apparatuses may be distributed or integrated functionally or physically in any arbitrary units, according to various loads and the status of use. For example, each database can be independently structured as an independent database apparatus and a part of the processing can be realized by a common gateway interface (CGI).

As described above, according to an embodiment of the present invention, the color property at the time of use can be accurately reproduced. More specifically, because a mechanism for acquiring the usage log of the apparatus is included, it becomes possible to assure the same quality between the input data and the output data in consideration of the variation of the property based on the usage log.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a storing unit that stores a color-conversion table for reproducing a color property that is unique to the image processing apparatus;
an updating unit that updates the color-conversion table;
an image processing unit that processes an input image data based on updated color-conversion table;
a tamper-resistant chip that includes
a first collecting unit that collects log information related to a usage of the image processing apparatus;
a generating unit that generates a hash value corresponding to collected log information; and
a recording unit that records generated hash value; and
an acquiring unit that acquires the log information corresponding to the hash value by referring to recorded hash value, wherein the updating unit updates the color-conversion table based on acquired log information.

2. The image processing apparatus according to claim 1, further comprising:
a second collecting unit that collects the log information accumulated in the image processing apparatus.

3. The image processing apparatus according to claim 1, further comprising:
a transmitting unit that transmits the log information to a server that is connected to the image processing apparatus via a network to store the log information in the server.

4. The image processing apparatus according to claim 1, wherein
the log information includes at least an apparatus identification number, a date and time when the apparatus is used, and an operating time for which the apparatus is used.

5. A method of updating a color-conversion table for reproducing a color property that is unique to an image processing apparatus that includes a tamper-resistant chip, the method comprising:
collecting including the tamper-resistant chip collecting log information related to a usage of the image processing apparatus;
generating including the tamper-resistant chip generating a hash value corresponding to collected log information;
recording including the tamper-resistant chip recording generated hash value;
acquiring the log information corresponding to the hash value by referring to recorded hash value; and
updating the color-conversion table based on acquired log information.

6. A computer program product comprising a computer usable medium having computer readable program codes embodied in the medium, which are for updating a color-conversion table for reproducing a color property that is unique to an image processing apparatus that includes a tamper-resistant chip, and when executed cause a computer to execute:
collecting including the tamper-resistant chip collecting log information related to a usage of the image processing apparatus;
generating including the tamper-resistant chip generating a hash value corresponding to collected log information;
recording including the tamper-resistant chip recording generated hash value;
acquiring the log information corresponding to the hash value by referring to recorded hash value; and
updating the color-conversion table based on acquired log information.

* * * * *